United States Patent [19]

Lovgren et al.

[11] Patent Number: 4,487,858
[45] Date of Patent: Dec. 11, 1984

[54] BLENDING TEMPERATURE SENSITIVE COMPONENTS INTO A SILICONE MODIFIED THERMOPLASTIC

[75] Inventors: Eric M. Lovgren, Westerlo; Joseph C. Golba, Jr., Ballston Spa; Randall A. Reed, Schenectady, all of N.Y.

[73] Assignee: General Electric Company, Schenectady, N.Y.

[21] Appl. No.: 540,079

[22] Filed: Oct. 7, 1983

[51] Int. Cl.$^3$ .......................... C08J 3/20; C08K 5/54; C08L 23/12
[52] U.S. Cl. .................................... 523/348; 524/267; 524/269; 524/437; 524/583; 264/211
[58] Field of Search ................. 523/348; 524/267, 269

[56] References Cited

U.S. PATENT DOCUMENTS

| 4,386,179 | 5/1983 | Sterling | 524/269 |
| 4,387,176 | 6/1983 | Frye | 524/437 |

FOREIGN PATENT DOCUMENTS 0149234 12/1978 Japan ................................. 523/348

*Primary Examiner*—C. Warren Ivy
*Attorney, Agent, or Firm*—Richard J. Traverso; James C. Davis, Jr.; James Magee, Jr.

[57] ABSTRACT

A continuous process for incorporating additives into a thermoplastic fluid blend is provided; said additives typically being sensitive to the temperature at which the blend is produced, said process comprising the steps of blending a high viscosity silicone fluid and thermoplastic composition initially and feeding the additives with more thermoplastic into the extruder for blending.

15 Claims, No Drawings

BLENDING TEMPERATURE SENSITIVE COMPONENTS INTO A SILICONE MODIFIED THERMOPLASTIC

Reference is made to copending applications of Joseph G. Golba, Jr., Ser. No. 528,383 filed Aug. 29, 1983 and Lovgren, et. al., Ser. No. 538,636, filed Sept. 29, 1983; assigned to the same assignee as the present invention.

BACKGROUND OF THE INVENTION

This invention relates to a method of producing blends of thermoplastic polymers and high viscosity silicone fluids which contain temperature sensitive additives. More particularly, this invention relates to a one-step process for producing a thermoplastic/silicone fluid blend containing additives sensitive to the blending temperature.

Blending thermoplastic polymers with silicone fluids often provides blends with desirable engineering properties and improved flame retardance, such as where the silicone fluid is part of a flame retardant package. Examples of such desirable blends are disclosed by McLaury, et. al. in U.S. Pat. No. 4,273,691 and by Frye in U.S. Pat. No. 4,387,176; both disclosures being assigned to the same assignee.

Producing thermoplastic/silicone fluid blends with temperature sensitive additives has presented certain problems. The dispersion obtained when blending high viscosity silicone fluids and certain thermoplastic compositions has been found to be directly related to the magnitude of the temperature during blending. The limitation on the magnitude of the blending temperature is typically the temperature at which the thermoplastic polymers within the thermoplastic composition degrade. For such blends there is often an optimum blending temperature range where a high degree of dispersion is obtained with minimal polymer degradation. When blending at these optimum temperatures, blends with superior engineering properties are obtained. Often a desirable additive is sensitive to these optimum blending temperatures. An example of such an additive is the flame retardant aluminum trihydrate. To avoid loss of the additive's properties during blending, the blending temperature must be reduced. As a result, the engineering properties of the thermoplastic/silicone fluid blend suffer.

The present method of avoiding the loss of superior engineering properties and maintaining the integrity of the additive is to blend the high viscosity silicone fluid and thermoplastic composition at an optimum blending temperature in the absence of the temperature sensitive additive and then subsequently blend in the temperature sensitive additive at a lower temperature. This procedure is disadvantaged in that two separate blending procedures are required. To produce these thermoplastic/silicone fluid blends continuously, two extruders are required, i.e., twice the equipment required for conventional blending is utilized. Alternatively, the blend sample may be blended within one extruder twice, once at the optimum blending temperature and once with the sensitive additive. Therefore, either the rate of production suffers or the equipment required must be increased when sensitive additives are incorporated in the blend.

It is desirable to produce thermoplastic/silicone fluid blends containing additives sensitive to the optimum blending temperatures in a continuous, one-step procedure. The present invention is based on the discovery that the blend may be cooled within the extruder by feeding in a solid thermoplastic composition without significantly affecting the dispersion of blend constituents.

SUMMARY OF THE INVENTION

A method of continuously producing a thermoplastic/silicone fluid blend comprising the steps of:

a. Blending a high viscosity silicone fluid having a viscosity of at least 90,000 centipoise at ambient temperature and a primary thermoplastic composition comprising one or more thermoplastic polymers within an extruder at a blending temperature sufficiently high to melt said thermoplastic composition, the weight ratio of the primary thermoplastic composition to the high viscosity silicone fluid providing a value in the range of 100 to 1;

b. Feeding in a manner as to achieve some cooling of the blend of step a, one or more additives sensitive to said blending temperature with a secondary thermoplastic composition comprising one or more thermoplastic polymers into said extruder downstream of the point where the blending in step a originates, the weight ratio of the secondary thermoplastic composition and the blend of step a providing a value in the range of 1 to 0.01; and c. Blending said blend of step a with the secondary thermoplastic composition and the additives of step b.

OBJECTS OF THE INVENTION

An object of the present invention is to provide a simple, one-step, continuous process for producing large quantities of thermoplastic/silicone fluid blends containing additive sensitive to the blending temperature.

Another object of the present invention is to produce thermoplastic/silicon fluid blends having additives sensitive to the blending temperature with improved property profiles.

Another object of the present invention is to introduce additives sensitive to the blending temperature of thermoplastic/silicone fluid blends without affecting the dispersion of the high viscosity silicone fluid.

DESCRIPTION OF THE PREFERRED EMBODIMENTS

The objects of the invention and other objects are accomplished by blending a high viscosity silicone fluid and a primary thermoplastic composition comprised substantially of one or more thermoplastic polymers within an extruder and feeding temperature sensitive additives with a secondary thermoplastic composition comprising one or more thermoplastic polymers downstream of the point where blending between the high viscosity silicone fluid and the primary thermoplastic composition takes place. The additives and secondary composition are then blended with the thermoplastic/silicone fluid blend within the extruder.

In the process comprising this invention an extruder is utilized to perform the blending steps. The process does not require a particular extruder or screw geometry to achieve the desired objects. However, a particular extruder or screw geometry may be preferred to provide suitable mixing and to avoid excessive degradation of the thermoplastic polymers. Twin screw extruders are often preferred for their high shear rates, their distribution of shear rates, and the type of agitation applied to the melt.

The blending of the high viscosity silicone fluid and primary thermoplastic composition that occurs within the extruder may be carried out in accordance with the process disclosed in copending application Ser. No. 538,636 wherein the primary thermoplastic composition is fed into the feed hopper and melted within an extruder, the high viscosity silicone fluid is fed into the molten primary thermoplastic composition within the extruder and said molten primary thermoplastic composition and said high viscosity silicon fluid are blended in the remaining portion of the extruder.

The blending of the high viscosity silicone fluid and the primary thermoplastic composition may also be accomplished in accordance with more conventional processes as disclosed in copending application Ser. No. 538,636 wherein the solid primary thermoplastic composition and high viscosity silicone fluid are premixed to provide a uniform feedstock suitable for placement within the feed hopper of a conventional extruder. The high viscosity silicone fluid and the primary thermoplastic composition are then heated simultaneously to a temperature sufficiently high to provide a viscosity for the thermoplastic polymers which allows them to flow and be blended with the high viscosity silicone fluid.

In both blending procedures, the blending temperature is determined by the thermoplastic polymers within the primary thermoplastic composition. The blending temperature must be sufficiently high to melt the primary thermoplastic composition. The preferred blending temperatures for primary thermoplastic compositions containing amorphous polymers typically fall within the range having a minimum value of about 70 to 80 degrees above the glass transition temperature of the polymer and the maximum value of about the temperature where degradation results. Where the primary thermoplastic composition contains crystalline polymers, the preferred temperatures fall within the range having a minimum value of about 20 to 30 degrees above the crystalline melting point of said polymers and a maximum value of about the degradation temperature of said polymers.

The extent of dispersion of a high viscosity silicone fluid within the primary thermoplastic composition during blending is dependent on the processing temperature at which blending takes place. Therefore, when attempting to maximize the dispersion of blend constituents in thermoplastic/silicon fluid blends, the blending temperature is adjusted to provide maximum dispersion. Often the degree of dispersion obtained increases with temperature. In such a situation, the optimum blending temperature range may approach the degradation temperature of the polymers within the primary thermoplastic composition. However, even at these temperatures maximum dispersion is obtained with zero or minimal polymer degradation.

Once the primary thermoplastic composition and high viscosity silicone fluid are blended at a blending temperature within the range defined above, the temperature sensitive additives which are desired in the finished blend are introduced into the extruder with a secondary thermoplastic composition comprising one or more thermoplastic polymers. The quantity of secondary thermoplastic polymer is preferably large enough to reduce the heat of the molten blend within the extruder to a point where the temperature sensitive additives will not be affected. By introducing solid thermoplastic polymer into the hot blend, sensible heat of the blend is consumed as the temperature of the solid thermoplastic increases to the process temperature. Where the solid thermoplastic polymer is crystalline, an additional amount of heat, the heat of fusion, which is required to melt the polymer is also consumed.

The temperature sensitive additives and the secondary thermoplastic composition can be fed anywhere along the extruder provided it is downstream of the point where blending of the high viscosity silicone fluid and primary thermoplastic composition initiates. It is preferable to introduce the additives and secondary thermoplastic composition at a point on the extruder where the desired dispersion has been obtained within the blend. This point can vary depending on the extruder and on the blending process. For example, where the blending is achieved by a side feed process, as disclosed in copending application Ser. No. 538,636, adequate blending may not be obtained before the midpoint of the extruder, since no blending takes place in the extruder until the silicone is injected. Where a twin screw extruder is utilized, it is preferable to feed the additives and solid secondary thermoplastic composition at a point about ⅔ the extruder length from the feed hopper. This ensures that the secondary thermoplastic composition is dispersed within the blend and that blending between the high viscosity silicone fluid and primary thermoplastic composition is adequate.

The degree of agitation necessary to blend the secondary thermoplastic composition into the molten blend within the extruder is not as high as that required to initially disperse the high viscosity silicone fluid into the primary thermoplastic composition. Where the secondary thermoplastic composition and the primary thermoplastic composition are similar, the degree of agitation that is necessary is even less.

The secondary thermoplastic composition may be fed simultaneously with the temperature sensitive additives or it may be fed before the additives so as to cool down the blend within the extruder prior to introduction of the additives. As indicated above, the secondary thermoplastic composition must be introduced downstream of the point where blending between the high viscosity silicone and primary thermoplastic composition is initiated. It is preferable to introduce the secondary thermoplastic composition subsequent to obtaining the desired dispersion of high viscosity silicone within the primary thermoplastic composition.

Once the secondary thermoplastic composition and temperature sensitive additives are introduced into the extruder, they are blended with the thermoplastic/silicone fluid blend within the extruder. Preferably, this blending procedure takes place at a temperature which does not antagonize the additives introduced. Typically, this temperature is below the blending temperature utilized to blend the high viscosity silicone fluid and the primary thermoplastic composition. The blending temperature must be sufficiently high to maintain the viscosity of the polymers within the primary thermoplastic composition and the secondary thermoplastic composition at a value that permits them to flow and be blended with other constituents. Minimum temperatures for the polymers in the secondary composition are the same as for those in the primary thermoplastic composition.

The weight ratio of the primary thermoplastic composition to the high viscosity silicone fluid preferably provides a value in the range of 100 to 1. Most preferably the value of such a ratio falls in the range of about 5 to about 2. It is often preferable to produce a blend which is predominantly thermoplastic polymer in the initial blending step to reduce the agitation which is necessary to disperse the secondary thermoplastic composition.

Preferably, the quantity of thermoplastic polymers utilized in the secondary thermoplastic composition is sufficiently high to cool the blend within the extruder to a temperature that permits the additives to be introduced without any harmful effect. Therefore, the quantity of thermoplastic polymer utilized typically falls within the range of about 50% to about 1% of the total weight of the high viscosity silicone fluid and the primary thermoplastic composition blended within the extruder. However, the quantity of thermoplastic polymers within the secondary thermoplastic composition must not be so high as to prevent adequate mixing in the remaining portion of the extruder.

Thermoplastic polymers which are suitable for use in this process include, for example, polycarbonates, low density polyethylenes, high density polyethylenes, polypropylene, polyphenylene ethers, poly (alkyleneterephthalates), polystyrene, polyesters, acrylonitrile, butydiene, styrene, polyethylene ethers-polystyrene blends and copolymers, polybutylene, polycaprolactans, etc. Suitable acrylic polymers include acetyl, ethylene, vinyl acetate, polymethyl-pentene, flexible polyvinyl-chloride, etc. It is not intended that the above listing be all inclusive.

The high viscosity silicone fluids are principally comprised of high molecular weight siloxane polymers having viscosity values in the range of 90,000 centipoise and above at ambient temperature. The siloxane polymers are typically comprised of chemically combined siloxy units selected from the group consisting of:

$R_3SiO_{0.5}$
$RR'SiO$
$R_2SiO$
$R'_2SiO$
$R'SiO_{1.5}$
$RSiO_{1.5}$
$R'R_2SiO_{0.5}$ and $SiO_2$ units, wherein each R represents a saturated and unsaturated monovalent hydrocarbon radical, R' represents a radical such as R or a radical selected from the group consisting of a hydrogen atom, hydroxy, alkoxyaryl, allyl, vinyl, aryl radical, etc. A preferred siloxane polymer is polydimethylsiloxane having a viscosity of about 90,000 to 1,500,000 centipoise at 25° Centigrade.

Other constituents which may be found in the high viscosity silicone fluids include silicone resins as defined by Frye in U.S. Pat. No. 4,387,176. These are typically characterized by the monomers within them. For example, MQ resins are comprised of M units of the formula $R_3SiO_{0.5}$ and tetrafunctional Q units of the formula $SiO_2$. An example of a suitable MQ silicone resin is polytrimethylsilylsilicate, which can have a ratio of M to Q units providing a value range of 0.3 to 4.0. Silicone resins containing other units such as the trifunctional unit $RSiO_{1.5}$, are also suitable. Where a silicone resin is utilized in the high viscosity silicone fluid a criteria for suitability is that each silicone resin be soluble or dispersable within the mixture of high molecular weight siloxane polymers that are present so as to provide a homogeneous mixture. It is preferable to premix the silicone resins and the siloxane polymers prior to blending with the primary thermoplastic composition within the extruder.

The preferred high viscosity silicone fluids are those disclosed by Frye in U.S. Pat. No. 4,387,176. These silicone fluids typically contain a mixture of high molecular weight siloxane polymers and one or more silicone resins. An example of a high viscosity silicone fluid disclosed by Frye is a mixture containing a silanol stopped polydimethylsiloxane polymer and polytrimethylsilylsilicate MQ resin.

The blend constituents which are added subsequent to the blending of the high viscosity silicone fluid and the primary thermoplastic composition are typically sensitive to high temperatures. An example of such a blend constituent is aluminum trihydrate. This additive offers flame retardance to thermoplastic compositions by dehydrating when exposed to heat of the combustion process. If exposed to high processing temperatures, aluminum trihydrate can dehydrate in the extruder and its flame retardance mechanism is lost.

Although this process is useful for introducing additives which are sensitive to the blending temperature, additives which are insensitive to the blending temperature can also be introduced to the blend.

These additives may include, for example, reinforcing fillers, cross-linking agents, antioxidants, lubricants (processing aids), flame retardants, etc. Where the additives are insensitive to the processing temperatures, they are often apportioned between the molten thermoplastic composition and the silicone fluid when produced by a side fed operation. Where the blends are produced by a conventional continuous process, the additives are introduced into the feed hopper with the pre-mixed high viscosity silicone fluid and primary thermoplastic composition. Suitable additives which can be found in the finished blend include those disclosed by Frye in U.S. Pat. No. 4,387,176. These more particularly include Group IIA metal organic compounds or salts, such as magnesium stearate, calcium stearate, barium stearate, etc., which enhance the flame retardance of the thermoplastic/silicone fluid blend. Other flame retardants include the more conventional materials, such as antimony oxide and decabromodiphenyl oxide. Cross linking agents, such as dicumyl peroxide and primary reinforcing fillers, such as fume silica, clay, talc, wollastonite, calcium carbonate, aluminum trihydrate, etc. can be fed into the feed hopper with the solid primary thermoplastic composition.

When producing blends of polypropylene and high viscosity silicone fluids having additives sensitive to the blending temperature, the polypropylene is preferably preblended with the desired additives which are insensitive to the blending temperature where these blends are produced by the side fed process disclosed in S.N. 538,636. These typically include, for example, cross linking agents, reinforcing fillers, antioxidants and processing aids.

The polypropylene and silicone fluid are typically blended at a temperature within the range of about 200° to 300° Centigrade, the preferred blending temperature falling within the range of about 210° to 230° Centigrade. Under these conditions, at most only minor polypropylene degradation results and the dispersion of the high viscosity silicone fluid is sufficiently high to provide excellent engineering properties (impact resistance, tensile strength, etc.).

An example of a desired constituent which is sensitive to the preferred processing temperature range of 210° to 230° Centigrade is aluminum trihydrate. This additive dehydrates at these temperatures resulting in a loss of its flame retardant capabilities. Although other flame retardants are insensitive to such optimum blending temperatures, aluminum trihydrate has been found to offer improved flame retardance to polypropylene/silicone fluid blends when produced by this process. Such blends typically exhibit short average burn times of 5 seconds or less after exposure to a flame test in accordance with Underwriters Laboratories, Incorporated Bulletin UL-94.

The aluminum trihydrate is preferably introduced into the extruder with additional polypropylene, the quantity of polypropylene ranging from 1% to 100% by weight of the polypropylene/silicone fluid blend produced within the extruder. Most preferably, the quantity of polypropylene is sufficiently high to reduce the temperature of the thermoplastic/silicone fluid blend within the extruder to a temperature within the range of about 180° to 200° Centigrade. The temperature of the polypropylene not only cools the blend by consuming sensible heat, it also cools the blend by consuming the heat of fusion necessary to melt the solid crystalline polymer.

The point of injection of the aluminum trihydrate and polypropylene is about one-half to two-thirds the extruder length from the feed hopper, the point of injection being independent of the type of process utilized to produce the thermoplastic/silicone fluid blend. The preferred quantity of aluminum trihydrate typically falls within the range of 0.1% to 5% by weight of the finished blend.

The thermoplastic polymers utilized in the secondary thermoplastic composition may be the same as, but are not limited to the thermoplastic utilized in the primary composition. When producing thermoplastic/silicone fluid blends containing polyphenylene ether, polystyrene and a high viscosity silicone fluid, polyphenylene ether may principally comprise the primary thermoplastic composition and polypropylene may principally comprise the secondary composition.

The following examples are provided in order that those skilled in the art may be better able to understand this invention. They are provided to illustrate this invention and are not intended to limit the scope of this invention.

EXAMPLE I

A polypropylene/silicone fluid blend was produced utilizing Werner and Pfleiderer Model ZSK-30 co-rotating twin screw extruder with intensive mixing screws 30 mm in diameter and 29 diameters in length. A fully formulated blend was produced in a single pass, said blend comprising 57.7 parts by weight polypropylene, 8.5 parts by weight high viscosity silicone fluid (comprising polydimethyl-siloxane and MQ resin in a ratio having a value within the range of 1.9 to 1.0), 4.0 parts by weight magnesium stearate, 18.8 parts by weight aluminum trihydrate (ATH) flame retardant and the remaining portion being decabromodiphenyl oxide.

The side feed process described in copending application Ser. No. 538,636, was utilized. The polypropylene magnesium stearate, aluminum trihydrate and decabromodiphenyloxide were introduced to the twin screw extruder through the feed hopper. The polypropylene was melted within the extruder and the silicone fluid was fed into the extruder at a point ⅓ of the extruder length from the feedhopper. The high viscosity silicone fluid and the molten thermoplastic composition were blended at various melt temperatures, including 188° C., 198° C., 204° C. and 215° C. at a screw speed of 300 RPM and throughput rate of 20 lbs/hr. Four additional samples were run at a screw speed of 500 RPM and throughput rate of 20 lbs/hr. at the temperatures indicated above. The burn times for the eight blends are shown in Table I. The burn times were taken in accordance with the test described in Underwriters Laboratories, Inc. Bulletin U.L.-94.

TABLE I

| Melt temperature | 188° C. | 198° C. | 204° C. | 215° C. |
|---|---|---|---|---|
| Burn times (sec) 300 RPM screw speed | 15 | 5 | 3.5 | 9 |
| Burn times (sec) 500 RPM screw speed | 18 | 7 | 5 | 6 |

EXAMPLE II

This example demonstrates embodiments of this invention where the integrity of the blend constitutents that are sensitive to the blending temperature of the high viscosity silicone fluid and thermoplastic composition is maintained. The blend samples produced in this example had a similar composition to those produced in Example I, i.e. 57.7 parts by weight of polypropylene, 8.5 parts by weight high viscosity silicone fluid (polydimethyl-siloxane and MQ resin), 4.0 parts by weight magnesium stearate, 18.8 parts by weight aluminum trihydrate (ATH) flame retardant and the remaining portion being decabromodiphenyl oxide.

The same co-rotating twin screw extruder was utilized and the side fed process disclosed in copending application Ser. No. 538,636 was utilized to produce the silicone fluid/primary thermoplastic composition blend. The polypropylene; magnesium stearate and decabromodiphenyl oxide were introduced into the feedhopper of the co-rotating twin screw extruder, the polypropylene being in an amount of 52 weight percent of the finished blend. The polypropylene was melted within the extruder and the high viscosity silicone fluid was introduced to the extruder at a point about ⅓ the extruder length from the feedhopper. Three polypropylene/silicone fluid blends were produced at melt temperatures of about 200° C., 205° C.; and 210° C., respectively, and a screw speed of 500 RPM within the extruder. The ATH was fed with a portion of polypropylene, (5.7 weight percent of the finished blend) into the three blends downstream of the silicon injection part and blended in the extruder. The burn times for three blends were taken in accordance with the test disclosed in Bulletin U.L.-94 and are indicated in Table II along with the engineering properties of the blends.

TABLE II

| Melt temperatures | 200° C. | 205° C. | 210° C. |
|---|---|---|---|
| Burn times (sec) | 3.8 | 3.8 | 3.4 |
| Tensile strength (psi) | 3410 | 3412 | 3420 |
| Gardner impact (in. lbs.) | 148 | 165 | 184 |

EXAMPLE III

This example demonstrates an alternative procedure where polypropylene is not introduced with the ATH. The same three blends were produced at different melt temperatures than Example II; however, all the polypropylene was introduced into the feedhopper and the ATH was fed into the extruder downstream of the silicone injection part without polypropylene.

The burn times for the blends produced were taken in accordance with the flamability test described in Bulletin U.L.-94. The burn times and engineering properties appear in Table III.

TABLE III

| Melt temperatures | 190° C. | 210° C. | 220° C. |
|---|---|---|---|
| Burn times (sec) | 15 | 7 | 9 |
| Tensile strength (psi) | 3450 | 3440 | 3465 |
| Gardner Impact (in lbs.) | 120 | 50 | 160 |

The data in Table III illustrates the erratic burn times obtained by this process indicating dehydration of ATH results.

Although the above examples have shown various modifications of the present invention, further modifications are possible in light of the above teaching by one skilled in the art without departing from the spirit and scope of the invention.

What is claimed is:

1. A method of continuously producing a thermoplastic/silicone fluid blend comprising:
   a. blending a high viscosity silicone fluid having a viscosity of at least 90,000 centipoise at ambient temperature and a primary thermoplastic composition comprising one or more thermoplastic polymers within an extruder at a blending temperature sufficiently high to melt said primary thermoplastic composition, the weight ratio of said primary thermoplastic composition to said high viscosity silicone fluid providing a value in the range of 100 to 1;
   b. feeding in a manner as to achieve some cooling of the blend of step a, one or more additives sensitive to said blending temperature with a secondary thermoplastic composition comprising one or more solid thermoplastic polymers into said extruder downstream of the point where the blending in step A originates, the weight ratio of the secondary thermoplastic composition and the blend of step A providing a value in the range of 1 to 0.01; and
   c. blending said blend of step A with the secondary thermoplastic composition and the additives of step B.

2. A method as in claim 1 wherein the primary thermoplastic composition and the secondary thermoplastic composition are comprised of the same constituents.

3. A method as in claim 2 wherein the thermoplastic compositions are comprised essentially of one or more thermoplastics selected from the group consisting of polycarbonates, low density polyethylenes, high density polyethylenes, polypropylene, polyphenylene ethers, poly(alkylene terephthalates, polystyrene, polyesters, polyamides, polyimides, polyurethanes, terpolymers of acrylonitriles, butadiene and styrene.

4. A method as in claim 3 wherein the thermoplastic compositions contain 1 to 3% filler selected from the group consisting of talc, clay, fumed silica, calcium carbonate, and wollastonite; and 5 to 10% cross-linking agent selected from the group consisting of dicumyl peroxide.

5. A method as in claim 4 wherein the primary thermoplastic composition and the secondary thermoplastic composition consist essentially of polypropylene.

6. A method as in claim 1 wherein the high viscosity silicone fluid is comprised of 40 to 100% of polysiloxane polymers having an average molecular weight of 50,000 and above and 2 to 40% of an MQ silicone resin wherein the M units are of the formula $R_3SiO_{0.5}$ and the Q units are of the formula $SiO_2$.

7. A method as in claim 6 wherein said high viscosity silicone fluid is comprised of about 20 to 100% polydimethylsiloxane.

8. A method as in claim 7 wherein the high viscosity silicone fluid contains 2 to 50% MQ silicone resin wherein the ratio of M units to Q units falls within the range of 0.3 to 4.0.

9. A method as in claim 5 wherein the high viscosity silicone fluid and the polypropylene are blended at a temperature falling within the range of 200° to 230° C.

10. A method as in claim 9 wherein the blending temperature falls within the range of about 210° to 230° C.

11. A method as in claim 10 wherein the temperature sensitive additive is principally comprised of aluminum trihydrate.

12. A method as in claim 11 wherein the ratio of high viscosity silicone fluid to the primary thermoplastic composition is four to one and the ratio of the secondary composition to the blend of step A is within the range of 1 to 0.05.

13. A method of continuously producing a polypropylene/silicone fluid blend comprising:
   a. blending a high viscosity silicone fluid having a viscosity of at least 90,000 centipoise at ambient temperature and a composition comprised substantially of polypropylene within an extruder at a temperature within the range of about 210° to 230° C., the weight ratio of polypropylene to the high viscosity silicone fluid providing a value within the range of about four to one;
   b. feeding aluminum trihydrate with polypropylene into an extruder downstream of the point where the blending into an extruder downstream of the point where the blending in step A originates said feeding is in a manner as to achieve some cooling of the blend of step a, the weight ratio of the blend of step A and the secondary portion of polypropylene providing a ratio of about 100 to 1; and
   c. blending said blend of step A with the secondary portion of polypropylene and the aluminum trihydrate.

14. A method as in claim 13 wherein the high viscosity silicone fluid is comprised of 20 to 100% polydimethylsiloxane and 2 to 40% MQ silicone resin wherein the ratio of the M units to Q units fall in the range of about 0.03 to 4.0.

15. A polypropylene/silicone fluid blend containing aluminum trihydrate produced in accordance with the process of claim 14, said blend comprising
   a. 40 to 80% polypropylene;
   b. 10 to 40% polydimethylsiloxane;
   c. 5 to 20% MQ resin, wherein the ratio of M to Q units is within the range of 0.03 to 4.0.
   d. 1% to 18% aluminum trihydrate;
   e. 0 to 10% talc; and
   f. 0 to 15% cross-linking agent selected from the group consisting of dicumylperoxide and decabromyldiphenyloxide.

* * * * *